(12) United States Patent
Wang et al.

(10) Patent No.: US 12,278,491 B2
(45) Date of Patent: Apr. 15, 2025

(54) SYSTEMS AND METHODS FOR ENERGY CROWDSOURCING AND PEER-TO-PEER ENERGY TRADING

(71) Applicants: Board of Regents, The University of Texas System, Austin, TX (US); Southern Methodist University, Dallas, TX (US)

(72) Inventors: Shen Wang, San Antonio, TX (US); Ahmad Fayez Taha, San Antonio, TX (US); Jianhui Wang, Dallas, TX (US)

(73) Assignees: Board of Regents, The University of Texas System, Austin, TX (US); Southern Methodist University, Dallas, TX (US)

( * ) Notice: Subject to any disclaimer, the term of this patent is extended or adjusted under 35 U.S.C. 154(b) by 756 days.

(21) Appl. No.: 16/688,977

(22) Filed: Nov. 19, 2019

(65) Prior Publication Data

US 2020/0161858 A1 May 21, 2020

Related U.S. Application Data

(60) Provisional application No. 62/769,377, filed on Nov. 19, 2018.

(51) Int. Cl.
*H02J 3/00* (2006.01)
*H02J 3/04* (2006.01)
*H04L 9/06* (2006.01)

(52) U.S. Cl.
CPC ............ *H02J 3/008* (2013.01); *H02J 3/04* (2013.01); *H04L 9/0637* (2013.01)

(58) Field of Classification Search
CPC ..... H02J 3/008; H02J 3/04; H02J 3/06; H04L 9/0637; H04L 9/50; H04L 9/3239; Y04S 50/10; Y04S 40/20
See application file for complete search history.

(56) References Cited

U.S. PATENT DOCUMENTS

| | | | |
|---|---|---|---|
| 11,031,785 B1* | 6/2021 | Erokhovets | H02J 3/40 |
| 2017/0358041 A1* | 12/2017 | Forbes, Jr. | G06Q 20/02 |
| 2019/0104196 A1* | 4/2019 | Li | G06F 16/27 |

\* cited by examiner

*Primary Examiner* — Hal Kaplan
*Assistant Examiner* — Thai H Tran
(74) *Attorney, Agent, or Firm* — Thomas|Horstemeyer, LLP (57) ABSTRACT

A crowdsourced energy system includes a plurality of distributed energy resources managed by crowdsourcees of the system, a power network to which the distributed energy resources are connected, and a system operator that manages energy trading transactions and energy delivery within the system, the system operator operating at least one computing device configured to: obtain day-ahead peer-to-peer energy trading transaction requests from crowdsourcees for energy to be delivered from the distributed energy resources, estimate day-ahead energy load and solar forecasts, determine optimal power flow for the delivery of energy, and schedule delivery of energy from the distributed energy resources across the power network based upon the energy trading transaction requests, the estimated forecasts, and the determined optimal power flow.

18 Claims, 8 Drawing Sheets

SYSTEMS AND METHODS FOR ENERGY CROWDSOURCING AND PEER-TO-PEER ENERGY TRADING

CROSS-REFERENCE TO RELATED APPLICATION

This application claims priority to U.S. Provisional Application Ser. No. 62/769,377, filed Nov. 19, 2018, which is hereby incorporated by reference herein in its entirety.

BACKGROUND

Smart grid technologies, such as microgrids and distributed energy resources (DERs), have drastically changed the way electricity is generated and consumed in two dimensions. First, the rapid increase in energy "prosumers" introduces new grid participants and provides a more decentralized and open power grid. Second, this changes the role of a system operator or utility from a power retailer to a service provider, renting transmission/distribution lines to prosumers rather than solely selling units of energy. This paradigm shift requires the creation of new trusted software platforms, distributed operation/control algorithms, and computational methods to enable reliable grid operations, prosumer engagement, and incentivize utility business model innovations.

BRIEF DESCRIPTION OF THE DRAWINGS

The present disclosure may be better understood with reference to the following figures. Matching reference numerals designate corresponding parts throughout the figures, which are not necessarily drawn to scale.

DETAILED DESCRIPTION

In the following disclosure, various specific embodiments are described. It is to be understood that those embodiments are example implementations of the disclosed inventions and that alternative embodiments are possible. Such alternative embodiments include hybrid embodiments that include features from different disclosed embodiments. All such embodiments are intended to fall within the scope of this disclosure.

Introduction

Figure 1:
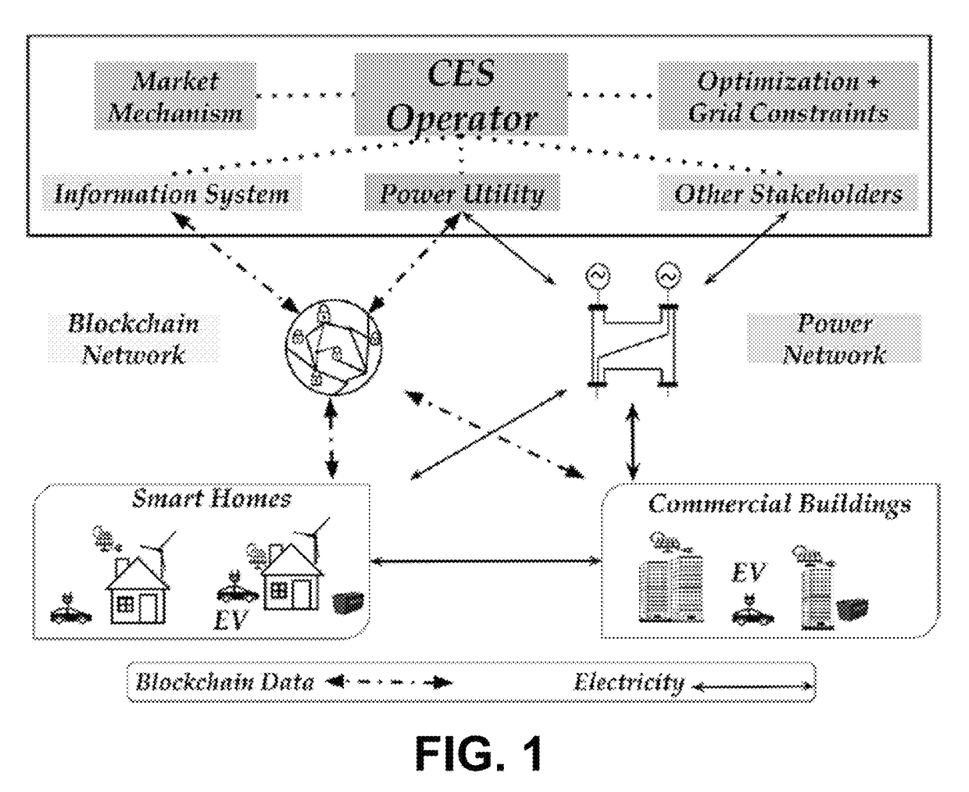
FIG. 1 is a schematic diagram that illustrates a blockchain-assisted architecture of operation in a crowdsourced energy system, according to various example embodiments.

Crowdsourcing is a major drive for various industries and has been utilized in various disciplines, such as medicine, cyber-physical systems, and engineering system design. The central theme in crowdsourcing is the utilization of the crowd's power to achieve system-level objectives. To see how crowdsourcing can be applied in energy systems, we provide an analogy from the most popular crowdsourcing markets, the Amazon Mechanical Turk (MTurk), which enables people to post jobs with monetary rewards and expiry dates. Energy crowdsourcing offers the possibility of the transformation in energy systems, and this disclosure puts forth operational models of crowdsourced energy system (CES) for collaborative production and consumption in energy markets, shown in FIG. 1. The tasks in CES can be plugging in an electric vehicle, charging/discharging a battery, deferring loads, and supplying the power network with renewable energy via solar panels, with the objective of satisfying a near-real-time demand shortage/surplus. These tasks can be automated via smart inverters, plugs, and meters while interfacing with power utilities and a distributed blockchain implementation.

This transformation in sustainable energy systems, where energy management is crowdsourced by prosumers, will be supported by two key, disruptive scientific technologies.

1) New modeling and crowdsourcing-centered methods that perform real-time grid management while maintaining the grid's stability.
2) A secure cyber-infrastructure design to manage and coordinate millions of energy-trading transactions (ETTs) (prosumer-prosumer or prosumer-operator trades).

The majority of the new modeling methods are based on optimal power flow (OPF) operation models and the secure cyber-infrastructure design is implemented by the promising blockchain technology. However, both the new modeling methods and the implementation of blockchain have limitations. First, the computed OPF setpoints for DERs and controllable loads might not be eventually adopted by crowdsourcees and prosumers. Second, it is unclear how energy trading between prosumers can take place within the operational models. Third, the utilized blockchain architectures are not scalable to include millions of ETTs, especially considering that blockchain-based trades consume a significant amount of energy. This disclosure addresses these gaps, and the main contributions and organization are given as follows:

1) An operational framework and model of CESs in distribution networks is presented considering various types of ETT and crowdsourcees. The presented framework enables peer-to-peer (P2P) energy trading at the distribution level, where ubiquitous distribution-level asset owners can trade with each other. This has not been done before in association with distributed OPF routines and blockchain-enabled architecture. In such a framework, an operator is needed to clear the market and ensure there is no violation of any technical constraints (e.g., distribution line limits). A distribution system operator can assume this role running the presented CES operational model. Extensions to operator-free, islanded microgrids are also showcased.

2) A two-phase, near real-time operation algorithm for CESs is explored. The first phase focusing on the day-ahead scheduling of generation and controllable DERs manages the bulk of grid-operation, while the second phase is developed to balance hour-ahead even real-time deficit/surplus in energy via monetary incentives. The developed two-phase algorithm supports arbitrary P2P energy trading between prosumers and utility, resulting in a systematic way to manage distribution networks amid P2P energy trading while incentivizing crowdsourcees to contribute to this ecosystem. The algorithm supports operation of islanded, self-autonomous microgrid, as is discussed below.

3) The CES framework is implemented and prototyped within IBM Hyperledger Fabric platform, which is an efficient blockchain implementation. This implementation allows the system operator to manage the network and supports users to log in, manage their own account, and carry on the energy trading with utilities or neighborhoods. This prototype communicates with the two-phase algorithm presented in this disclosure, is open source, and can be used by utilities. Finally, numerical tests on a distribution network and blockchain prototype illustration are provided.

Technology Review
Grid Operation, OPF, and Demand Response

Recent studies have investigated integrating the operation of DERs in distribution networks. The focus of majority of these studies is on unit commitment, economic dispatch problems, scheduling of DERs, and maintaining the grid's frequency and voltage within acceptable ranges while given uncertainty from renewables and load forecasts.

Another branch of related work studies the design of demand response signals and incentives to drive DER owners to contribute to energy production. In summary, there are three approaches to demand response: 1) reducing demand by using local DERs; 2) reducing demand through shifting controllable loads; and 3) designing efficient generator set-points to reduce the total generation. The majority of demand response schedules focus on operational timescale. Further, the need for real-time regulation and distributed dynamic pricing as a function of the grid's physical status motivates new physics-aware pricing mechanisms. Background on blockchain and energy trading routines are discussed next.

Blockchain and Energy Trading Systems

Blockchain is a distributed ledger based on a set of communication and consensus protocols that ensure the ledger integrity through interlinked, cryptographically signed, and time-stamped blocks that define transactions. The blockchain concept originated with the Bitcoin protocol, which utilized a proof of work (PoW) consensus mechanism where miners combine transactions into Merkle tree-based blocks and compete to find a random nonce that produces a hash digest within a predefined range. However, this approach has many limitations, including its significant energy consumption, scalability in the number of transactions/seconds, privacy concerns with a public ledger, and single purpose application (i.e., an exchange of the Bitcoin cryptocurrency). A number of additional blockchain technologies have been introduced to address these challenges as suggested below.

1) Efficient Consensus Mechanisms: A consensus protocol is used to ensure the unambiguous ordering of transactions and guarantees the integrity and consistency of the blockchain across distributed nodes; the annual estimated electricity consumption of Bitcoin PoW consensus is 47.1 Terawatt-hour, a staggering 0.21% of world's electricity consumption. Furthermore, PoW techniques typically have limitations on the number of transactions per second, which limits the use in high performance environments. Other consensus mechanisms, such as proof of stake (e.g., Ethereum Casper) or redundant byzantine fault tolerance (RBFT) (e.g., IBM Hyperledger Fabric), can be used to reduce energy consumption.

2) Smart Contracts: Smart contracts provide protocols and Turing-complete virtual machines that enable nodes to execute some program based on the results of new transactions and allow the blockchain to support sophisticated logic. Smart contracts and blockchain provide an excellent platform to perform ETT. In particular, Licata provided a high-level description to the main merits of using cryptocurrency and blockchain in energy systems.

3) Permissioned and Privacy Mechanisms: Blockchain platforms can be categorized into public and private, where public implies that any miner can contribute to the consensus and block creation, while permissioned chains restrict block creation to a predefined set of parties. Therefore, permissioned chains may be preferred in applications with defined authorities or entities with management responsibilities.

Table I summarizes the attributes of different implementations of current blockchains.

TABLE I

Various Implementations of Blockchain

|  | Bitcoin | Ethereum | Hyperledger Fabric |
|---|---|---|---|
| Cryptocurrency | Bitcoin | Ether | None |
| Network | public | public | permissioned |
| Transactions | anonymous | anonymous | public/confidential |
| Consensus | PoW | PoW | RBFT |
| Smart Contracts | None | Solidity | Chaincode |
| Language | C++ | C++/Golang | Golang/Java |

Integrated Operational Model of CESs

In this section, we present an integrated operational model of CESs that considers a wide range of DERs, different types of crowdsourcees, and ETT in distribution networks. For simplicity, we focus on radial distribution networks with a single feeder connected to traditional generation and utility-scale renewables. We consider a CES at the feeder level with n buses modeled by a tree graph $(N,\varepsilon)$, where $N=\{1, \ldots, n\}$ is the set of nodes and $\Sigma \subseteq N \times N$ is the set of lines. Define the partition $N=G \cup C \cup L$, where $G=\{1, \ldots, n_g\}$ collects the $n_g$ utility-scale power generation connected to the feeder/substation; $C=\{1, \ldots, n_c\}$ collects the buses containing $n_c$ users who signed up for crowdsourcing schedules; $L=\{1, \ldots, n_l\}$ collects load buses.

Figure 2:
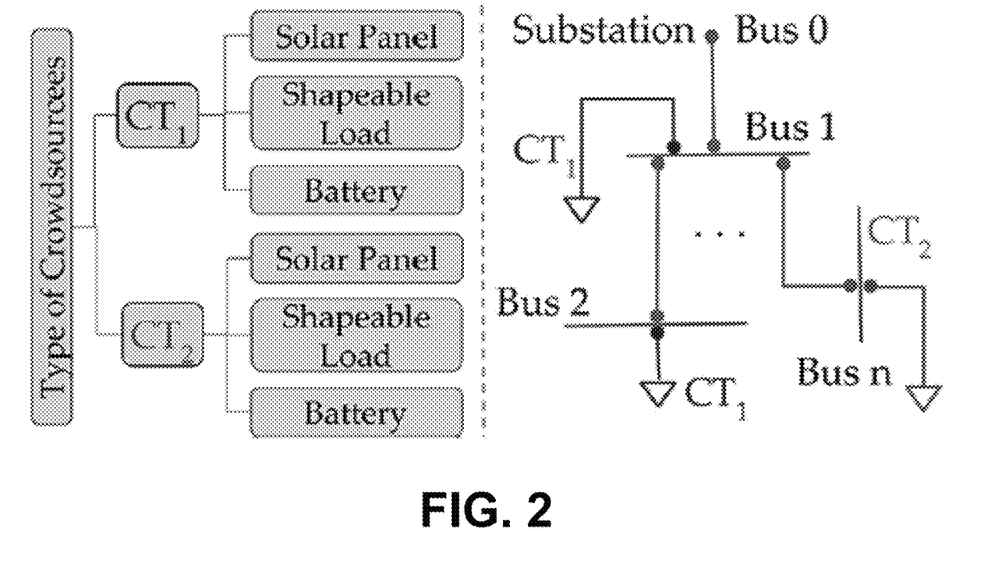
FIG. 2 is a schematic diagram that illustrates a radial power network with different types of energy crowdsourcees, according to various example embodiments.

The crowdsourcer, one type of participant, is the utility company or any other system operator, we distinguish between two types of crowdsourcees in C. Type 1 crowdsourcees commit in the day-ahead markets (and perhaps monthly or yearly) to the crowdsourcing tasks requested by the operator. Type 1 crowdsourcees also include users who give complete control of their DERs to the operator. In return, the operator provides socio-economic incentives or discounts on the electric bill. Type 2 crowdsourcees provide near real time adjustments or decisions based on real-time notifications and decisions from the operator. For example, the operator informs Type 2 crowdsourcees about the crowdsourced task (e.g., charging/discharging an electric vehicle) which depends on the users' location in the network and the physical state of the grid. Type 1 crowdsourcees provide operators with day-ahead planning flexibility, in contrast with Type 2 crowdsourcees who operate on a faster timescale. The distinction between these two types of users is needed as it resembles projected market setups. We define these two types as $CT_1$ and $CT_2$, with $C=CT_1 \cup CT_2$; this is depicted in FIG. 2.

Figure 3:
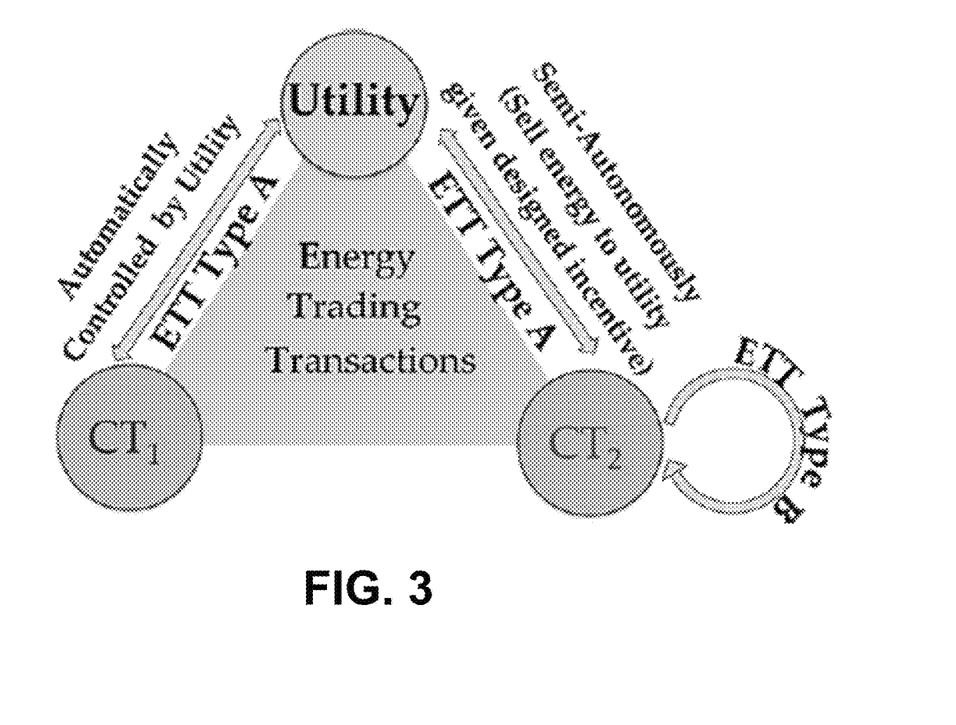
FIG. 3 is a schematic diagram that illustrates types of crowdsourcees and energy trading transactions, according to various example embodiments.

We consider two types of ETT. Type A: This is akin to what takes place in today's grids, where Type 1 or 2 crowdsourcees feed the grid with power. This type of transaction is solely between crowdsourcees and the network operator. Type B: Crowdsourcees can trade energy with each other where the seller injects power into the grid. FIG. 3 shows the types of crowdsourcees and transactions. Since energy production and demand response from Type 1 crowdsourcees are controlled by the operator, Type B transactions only occur among Type 2 crowdsourcees. However, Type A transactions can also take place between Type 2 crowdsourcees and the utility. The participants and the transaction types are illustrated in detail in FIG. 3. The Brooklyn Microgrid project is an example of Type B transactions for Type 2 crowdsourcees.

Operational Model of Generators, Loads and DERs

Let $i \in N$ denote the bus index of the distribution system and t denote the time period. We consider bulk, dispatchable generation from traditional synchronous generators, renewable energy generation from solar panels, fully controllable stationary batteries, uncontrollable loads, and shapeable loads.

1) Dispatchable Generators: Dispatchable generators are considered in this disclosure with a quadratic cost function. Dispatchable generation $S_{i,t}^g = P_{i,t}^g + jQ_{i,t}^g$ for $i \in G$ at t are considered to have quadratic cost functions as $C_{i,t}(P_{i,t}^g) = \alpha_{i,t}(P_{i,t}^g) + \beta_{i,t} P_{i,t}^g + \gamma_{i,t}$, where $\alpha_{i,t}, \beta_{i,t}$ are given parameters for the cost function of the ith generator at t.

2) Solar Energy Generation: Solar panels generate real power $P_{i,t}^r$ for bus $i \in C$ at t. Note that $CT_1$ crowdsourcees do not control whether $P_{i,t}^r$ is fed into the grid or not (it is controlled by the utility/operator), whereas $CT_2$ crowdsourcees dictate whether to use $P_{i,t}^r$ locally or sell it to the CES operator or other users.

3) Stationary Batteries: Batteries are modeled as dispatchable loads that can be controlled to withdraw or inject power. The quantity $P_{i,t}^b$ defines the output power of the batteries, where $i \in C$. Negative $P_{i,t}^b$ implies that power is withdrawn. The battery operational model is described as $$E_{i,t}^b = E_{i,t-1}^b + H_{i,t}^b \eta_{i,in} - D_{i,t}^b/\eta_{i,out} \quad (1a)$$

$$P_{i,t}^b = D_{i,t}^b - H_{i,t}^b \quad (1b)$$

$$0 \le D_{i,t}^b \le P_{i,t,dis}^b \quad (1c)$$

$$0 \le H_{i,t}^b \le P_{i,t,cha}^b \quad (1d)$$

$$E^{b,min} \le E_{i,t}^b \le E^{b,max} \quad (1e)$$

In the above battery model, we consider a unit time period; $\eta_{i,in}$ and $\eta_{i,out}$ represent charging and discharging efficiency constants. $H_{i,t}^b$ and $D_{i,t}^b$ is the charging and discharging power, both are optimization variables. The variable $E_{i,t}^b$, upper and lower bounded by $E^{b,min}$ and $E^{b,max}$, denotes the energy stored in battery at time t. The net power $P_{i,t}^b$ at t is the difference between the power of discharging and charging. $P_{i,t,dis}^b$ stands for the limitation of discharging power, $P_{i,t,cha}^b$ has a similar meaning for charging power. All of the variables related to batteries model are included in a single vector variable $x_{i,t}^b := (E_{i,t}^b, H_{i,t}^b, D_{i,t}^b, P_{i,t}^b)$.

4) Uncontrollable Loads: Uncontrollable loads (lights, plug loads, street lights, etc.) are considered to be given and are denoted by $S_{i,t}^u$ for all $i \in L$ (loads can include reactive power), where $S_{i,t}^u = P_{i,t}^u + jQ_{i,t}^u$.

5) Shapeable Loads: We consider shapeable loads, defined by $S_{i,t}^S = P_{i,t}^s + jQ_{i,t}^S$ for $i \in L$, such as plug-in electric vehicles and loads from appliances with flexible power profile but fixed energy demand $E_{i,demand}^S$ in 24 h. These shapeable loads must be satisfied between $t_{i,start}$ and $t_{i,end}$. The model describing the shapeable loads is given next $$E_{i,demand}^S = \sum_{t=1}^{T} S_{i,t}^S \Delta t \quad (2a)$$

$$S_{i,t}^S = 0, \text{ for } t = 1, \ldots, t_{i,start}, t_{i,end}, \ldots, T \quad (2b)$$

$$S_i^{S,min} \le S_{i,t}^S \le S_i^{S,max} \quad (2c)$$

where T is the length of the time-horizon and $\Delta t$ is the time interval. Similarly, a single vector variable $x_{i,t}^S := (S_{i,t}^S)$ collects variables related to shapeable loads.

Distribution Network Model

For each bus $i \in N$, denote $V_i = |V_i| e^{j\theta_i}$ as its complex voltage and $v_i = |V_i|^2$ as its magnitude squared. Let $s_i = p_i + jq_i$ be node i's net complex power injection. Also, $p_i$ denotes net real power injection. The net real power injection for each bus i at t can be expressed as $$p_{i,t} = P_{i,t}^g + P_{i,t}^b + P_{i,t}^r - P_{i,t}^u - P_{i,t}^s \quad (3)$$

Similarly for the net reactive power injection. For each line $i \in \varepsilon$ we denote bus i's parent and children buses as $A_i$ and $C_i$. Let $z_i = r_i + jx_i$ be its complex impedance, $I_i$ be the complex branch current from bus i to $A_i$, and $l_i = |I_i|^2$ be its magnitude squared. The variable $S_i = P_i + jQ_i$ denotes the branch power flow from bus i to $A_i$. For all buses in the network, define $x_t := (x^b, x^s)_t$ as a variable vector collecting the variables related to batteries and shapeable loads. Since two types of crowdsourcees are defined, $x_t$ is divided into two variables $x_{1_t}$ and $x_{2_t}$, which stands for the variables belong to Type 1 and Type 2 crowdsourcees and hence $x_t = (x_1, x_2)_t$. Let $y_t := (P_{i,t}^u, P_{i,t}^r)$ be a variable vector collecting the variables related to uncontrollable loads and solar energy. The preferences and setting parameters of crowdsourcees, including the willingness to sell energy, constants related to batteries, solar panel, or loads are communicated with the utility or the operator are denoted by $\chi_t$.

To model power flow in distribution networks, we use the branch flow model. This model eliminates the phase angles of $V_i$ and $I_i$ and uses only $(v_i, l_i, s_i, S_i)$ $$v_{A_i} = v_i - 2(r_i P_i + x_i Q_i) + \ell_i(r_i^2 + x_i^2) i \in \varepsilon \qquad (4a)$$

$$\sum_{j \in C_i}(P_j - \ell_j r_j) + p_i = P_i i \in N \qquad (4b)$$

$$\sum_{j \in C_i}(Q_j - l_j x_j) + q_i = Q_i i \in \varepsilon \qquad (4c)$$

$$P_i^2 + Q_i^2 = v_i \ell_i i \in \varepsilon \qquad (4d)$$

Due to (4d), the branch flow model is not convex. However, the model can be convexified using the second-order cone program (SOCP) relaxation and rewritten as $$\left\| \begin{bmatrix} 2 & 0 & 0 & 0 \\ 0 & 2 & 0 & 0 \\ 0 & 0 & 1 & -1 \end{bmatrix} \begin{bmatrix} P_i \\ Q_i \\ v_i \\ l_i \end{bmatrix} \right\| \leq [0 \ 0 \ 1 \ 1] \begin{bmatrix} P_i \\ Q_i \\ v_i \\ l_i \end{bmatrix} \qquad (5)$$

The nonconvex branch flow model can be cast through convex SOCP constraints denoted by CvxFlowModel($z_t$) that collects (4a)-(4c) and (5), and can be solved efficiently by interior-point method in polynomial time. In this disclosure, all branch flow variables are collected in a single vector variable $z_t := (v, l, s, S)_t$ at time t. Table II lists all variables introduced in this disclosure. The next section introduces the CES-OPF formulation and incentive design.

TABLE II

Notation for Various DERs in CES*

| Symbols | Description |
|---|---|
| $S_{i,t}^g$ | Dispatchable generation |
| $P_{i,t}^r$ | Real power generated from solar panel |
| $P_{i,t}^b$ | Output power of the battery |
| $S_{i,t}^u$ | Apparent power of uncontrollable load |
| $S_{i,t}^s$ | Apparent power of shapeable load |
| $p_{i,t}$ | Net real power injection at each bus |
| $x_{i,t}^b$ | A variable collecting all of the variables in battery model |
| $x_{i,t}^s$ | A variable collecting all the variables in shapeable model |
| $x_t$ | A variable collecting variables in battery and shapeable model |
| $y_t$ | A variable collecting the variables of uncontrollable loads and solar energy |
| $z_t$ | A variable collecting all of the branch flow variables |
| $\chi_t$ | Preferences and setting parameters of crowdsources |

*Symbols with or without subscript i, t have the same meaning for simplicity.

CES-OPF and Incentives Design

In this section, we propose a two-phase algorithm minimizing the cost of generation and thermal losses by rescheduling users' shapeable loads and DERs ahead of time. The algorithm also designs localized incentives that persuade users to participate in CES. In addition, the presented algorithm supports P2P ETT between different crowdsourcees and the utility. The developed two-phase algorithm supports arbitrary P2P energy trading between prosumers and utility, resulting in a systematic way to manage distribution networks amid P2P energy trading while incentivizing crowdsourcees to contribute to this ecosystem. The algorithm also supports the operation of islanded, self-autonomous microgrids.

The first phase of the algorithm is akin to day-ahead scheduling given load and solar forecasts, which belongs to optimization and grid constraints described above. This phase takes into account the types of crowdsourcees and their day-ahead preferences as well as the prescheduled ETTs among crowdsourcees. Given the day-ahead solutions from the first phase, the second phase reflecting market mechanism performs two significant operations. First, rectifying the mismatch in the day-ahead forecasts and hence the demand shortage/surplus by: 1) obtaining more accurate, hour-ahead forecasts and 2) solving for real-time deviations in the generator and DER setpoints. Second, allowing for real-time energy transactions through the design of monetary incentives that reward crowdsourcees. Table III summarizes the ETT types in relevance to the two-phase algorithm. For different phases and users, the pricing mechanism also changes. Contract pricing is decided by contract between $CT_1$ and utility, incentive pricing for $CT_2$ is further explained below. Negotiated pricing is determined between the crowdsourcees and their neighbors. In short, the first phase manages the larger chunk of operations, whereas the second phase deals with the mismatch in load and renewable energy generation. The details of the two-phase algorithm are discussed next.

TABLE III

ETT Types and Corresponding Relevance to the Two-Phase Algorithm

| | Seller | Buyer | Pricing Mechanism | Optimization Phase |
|---|---|---|---|---|
| ETT Type A | $CT_1$ | Utility | Contract pricing | Phase I |
| ETT Type B | $CT_2$ | Utility | Incentive pricing | Phase II |
| ETT Type B | $CT_2$ | $CT_2$ | Negotiated pricing | Phase I |

Phase I: Day-Ahead CES Operation

As discussed above, the network operator completely controls $CT_1$ users' DERs according to the signed contract, while $CT_2$ users decide to participate or not in the crowdsourcing schedules based on their preferences and the offered incentives, e.g., $CT_2$ users can sell their surplus solar power to the utility if designed incentive is sufficient or acceptable in the hour-ahead or real-time markets. This entails, and due to the nature of $CT_2$ users, that the output from solar panels $P_{i,t}^r$, batteries $P_{i,t}^b$, and shapeable loads $P_{i,t}^s$ for users $i \in CT_2$ are uncontrollable by the utility. Hence, if Type 2 crowdsourcees declare that they would not trade energy with other users (Type B transactions); then, in this phase, these quantities are excluded in (3) by setting them to zero yielding $$P_{i,t}^r = P_{i,t}^b = P_{i,t}^s = 0, i \in CT_2 \qquad (6)$$

Otherwise, the sellers and buyers should send the energy supply-demand requests for P2P energy trading day ahead to the utility. These requests for $CT_2$ users in time period t are expressed as constraint EnergyTrading($x_{2,t}, y_t$). This constraint ultimately transforms variables ($x_{2,t}, y_t$) to mere predefined constants since the users decide to inject (or receive) a certain amount of energy into (from) the grid. The CES-OPF is formulated as $$\text{CES-OPF: } \min_{\substack{x_t, z_t \\ P_t^g}} \sum_{t=1}^{T} J_t(x_t, z_t, P_t^g) \quad (7)$$

s.t. (1) – (3), (6), $y_t = y_t^{f-24hr}$, $x_t \in \chi_t$

CvxFlowModel($z_t$), $z_t^{min} \le z_t \le z_t^{max}$ $P_t^g \in \mathcal{P}$, EnergyTrading($x_{2_t}, y_t$)

The objective function of CES-OPF at time t is defined as $$J_t(x_t, z_t, P_t^g) = \sum_{i=1}^{n_g} C_{i,t}(P_{i,t}^g) + \sum_{i=1}^{|\mathcal{E}|} l_{i,t} r_i + \sum_{i=1}^{|CT_1|} U_i(x_t)$$

The objective is to minimize the generator's cost function, given by $\sum_{i=1}^{n_g} C_{i,t}(P_{i,t}^g)$, in addition to the thermal losses that are characterized by $\sum_{i=1}^{|\mathcal{E}|} l_{i,t} r_i$, and crowdsourcees' disutility function $U_i(x_t) = u_i (S_{i,t}^s - S_i^{S,max})^2 \forall t \le T_{set}$ designed to compensate for the inconvenience caused by rescheduling shapeable load. The parameter $u_i \in [0,1]$ stands for the urgency to finish a certain task before a setting time $T_{set}$; the $S_i^{S,max}$ is the same parameter appearing in (2); and $u_i$ is the parameter determined by users through preferences $\chi_t$.

The CES-OPF captures the cost of power losses between two peers through the second term of $J_t(\bullet)$ which sums the losses for all lines $\varepsilon$ in a distribution network. These lines include the distribution lines between any two users/peers, including traditional energy consumers. Preferences set by users are included in $\chi_t$ and are assumed to be linear and time dependent; $y_t^{f-24\ hr}$ is the day-ahead uncontrollable load and solar energy forecasts. Constants $z_t^{min}$ and $z_t^{max}$ are lower and upper bounds on branch flow model variable $z_t$ i.e., the voltage in p.u. at each node is in [0.95 1.05]. The linear ramp constraints and upper/lower bounds on $P_t^g$ are denoted by $\mathcal{F}$.

The CES-OPF can be decomposed into small optimization subproblems by decoupling variables and constraints and the overall problem can be then solved through a decentralized alternating direction method of multipliers (ADMMs) algorithm. Another approach is to simply solve CES-OPF in a centralized fashion after requesting the user's preferences $\chi_t$ ahead of time for medium- or small-scale distribution networks and microgrids. Another way of making CES-OPF more computationally tractable is to replace the convexified branch flow model with the LinDisFlow($z_t$) model which is linear in ($z_t$); this transforms CES-OPF to a quadratic program that can be solved for large-scale networks.

After solving CES-OPF, we obtain the equilibrium $S_i^{g,eq} = P_{i,t}^{g,eq} + jQ_{i,t}^{g,eq}$ and $x_{1_t}^{eq}$ which includes $P_{i,t}^{b,eq}$ and $S_{i,t}^{S,eq}$. This entails that the utility-scale generation, batteries, and shapeable loads belonging to $CT_1$ users will be fixed with this equilibrium for the next 24 h. To compensate crowdsourcees for their contributions, the distributed locational marginal price (DLMP), the time-varying electricity price for users at various buses in the network, is computed by finding the dual variables associated with the real power balance constraint in the convexified branch flow model, and denoted by $\lambda_{i,t}^{eq}$.

Phase II: Real-Time CES Incentives Design

As outlined above, we solve CES-OPF and obtain setpoints for utility-scale power plants and Type 1 crowdsourcees, knowing that some energy trading transactions will take place between crowdsourcees. In this section, the presented crowdsourcing incentive design performs the two key functions: 1) incentivizes Type 2 crowdsourcees to sell excess solar power to the utility and 2) mitigates and balances the unexpected load and solar output fluctuations due to the forecast error in the grid. The formulation presented in this section is solved every hour or less, depending on the availability of hour-ahead forecasts and the operator's preference.

Here, we outline the design of crowdsourcing incentives that provide near real-time ancillary services to relieve real-time demand shortage or surplus, and hence, the additional incentives which based on the amount of energy provided to the grid are offered for $CT_2$. For $i \in CT_2$, the amount of energy provided to the grid is depicted by the net injection power $P_{i,t}^{ni}$ and computed as $$P_{i,t}^{ni} = P_{i,t}^r - P_{i,t}^s P_{i,t}^b \quad i \in CT_2 \quad (8)$$

This indicates when solar panels produce more power, and the shapeable load reduces, more net injected power can be sold to the utility or other crowdsourcees through energy trading. Here, for $i \in CT_2$, shapeable loads and batteries cannot be scheduled 24 h ahead since no contract exists between Type 2 crowdsourcees and the utility. Hence, $P_{i,t}^s$ and $P_{i,t}^b$ belonging to variable $\chi_2$ are treated now as uncontrollable loads for $CT_2$ in Phase II. In addition, solar energy is also known ahead of time. Hence, $P_{i,t}^{ni}$ is known and not an optimization variable for Type 2 crowdsourcees from (8). The crowdsourcing incentive design routine for crowdsourcees i at time t is formulated as $$\text{CES-ID: } \min_{\substack{x_t, z_t \\ P_t^g, \lambda_t^a \\ b_t}} \sum_{i=1}^{n_g} C_{i,t}(P_{i,t}^g - P_{i,t}^{g,eq}) + \sum_{i=1}^{|\mathcal{E}|} l_{i,t} r_i + \sum_{i=1}^{|CT_2|} b_{i,t} \quad (9)$$

s.t. (1) – (3), (8), $x_{1_t} = x_{1_t}^{eq}$, $x_{2_t} \in \chi_{2_t}$ $y_t = y_t^{f-1hr}$, $z_t^{min} \le z_t \le z_t^{max}$ CvxFlowModel($z_t$), $P_t^g \in \mathcal{P}$ $b_{i,t} = P_{i,t}^{ni}(\lambda_{i,t}^{eq} + \lambda_{i,t}^a)$, $b_{i,y} \ge 0$, $i \in CT_2$ $$\sum_{i=1}^{|CT_2|} b_{i,t} \ge b_t^{total}, i \in CT_2.$$

In CES-ID, the objective is to minimize: 1) the deviation in the cost of generation from the day-ahead operating point; 2) the network's thermal losses; and 3) the budget $\sum_{i=1}^{|CT_2|} b_{i,t}$ (in $) which the operator has allocated to spend on the real-time incentives at the feeder level. The constraints are explained as follows. We set variables $P_{i,t}^b, S_{i,t}^s \in x_{1_t}$ to the equilibrium $P_{i,t}^{b,eq}, S_{i,t}^{s,eq} \in x_{1_t}^{eq}$ which is obtained by CES-OPF to schedule DERs that are controlled by the utility. For $i \in CT_2$, the willingness to sell energy to the utility is set in preference $\chi_{2_t}$ which sent to system operator. The constraints on $y_t, z_t, P_t^g$ are the same as CES-OPF (7) except that $y_t$ is set to the hour-ahead (or shorter) available forecast $y_t^{f-1\ hr}$.

Besides the optimization variables mentioned above, we consider that Type 2 crowdsourcees receive the final incentive price $\lambda_{i,t}^{eq} + \lambda_{i,t}^a$ where $\lambda_{i,t}^a$, additional variable, is an adjustment price which varies with the net energy injected to grid and location of $CT_2$: $\lambda_{i,t}^{eq}$ is DLMP computed by CES-OPF. The variable budget $b_{i,t}$ for $i \in CT_2$ at t is equal to $P_{i,t}^{ni}(\lambda_{i,t}^{eq} + \lambda_{i,t}^a)$, which is always greater than 0. As mentioned $P_{i,t}^{ni}, \lambda_{i,t}^{eq}$ are known. When the crowdsourcee i has no energy to sell to utility ($P_{i,t}^{ni} \le 0$), variable $\lambda_{i,t}^a$ is forced to approach $-\lambda_{i,t}^{eq}$ to make $b_{i,t}$ as $0^+$ (a small positive value which is approximately close to zero). Hence, no incentive is offered to those who inject no power into the grid. When $P_{i,t}^{ni}>0$ which means crowdsourcee i at t has excess energy to sell, variable $\lambda_{i,t}^{a}$ is forced to be small while also minimizing the final incentive price $\lambda_{i,t}^{eq}+\lambda_{i,t}^{a}$ and budget $b_{i,t}$ for all Type 2 crowdsourcees. At time t, the total budget for $CT_2$ is $b_t^{total}$, which can be set as a reasonable value. For example, this can be set to the cost for dispatchable generation to produce $\Sigma_{i=1}^{|CT_2|} P_{i,t}^{ni}$. Further explanations and examples are presented below.

Notice that both CES-OPF and CES-ID are based on branch flow model which is convex, and can be solved with great efficiency in polynomial time by interior-point optimizer. The CES-ID is solved hourly, and the computed incentives are sent to users at the end of the day. Thus, the energy trading (Type A transactions) between $CT_2$ users and the utility is finished. The transactions are done by the assist of blockchain, which is explained in the next section.

Blockchain and Smart Contracts Implementation for CESs

In this section, we discuss an implementation for blockchain that is scalable to accommodate millions of crowdsourcees and ETT. An algorithm to integrate the optimization models with this blockchain implementation is also presented.

Blockchain and Smart Contracts Implementation for CESs

While Table I summarizes the attributes of different blockchain platforms, this section identifies the properties most applicable for the proposed CES model and algorithms introduced above. Specifically, the blockchain platform must adequately address the goals to incorporate a precise set of CES users, the computational requirements of the CES algorithms, the performance of the consensus algorithms, and the privacy demands of the users. The CES requirements and blockchain properties for each of these domains are identified in Table IV. Based on this analysis, the Hyperledger is selected to meet the required CES requirements and necessary blockchain features. As previously mentioned, Hyperledger uses RBFT for consensus, which should minimize the energy required for each transaction. Furthermore, Hyperledger's permissioned model ensures that the participants are restricted to those within the distribution grids service region, and also prevents the exposure of privacy data from crowdsourcees. Finally, the smart contracts can be implemented through the chaincode mechanisms, which does not require the per-operation execution costs that are enforced on other public blockchains.

TABLE IV

CES Requirements Mapping to Blockchain Features

| | CES Requirements | Blockchain Features |
|---|---|---|
| Participants | The CES will be operated for a distribution grid, so users will be confined to a geographic area users | Permissioned chain as users should be restricted to those currently within that distribution area |
| Computation | CES must require performing non-linear optimizations such as solving power flow and economic dispatch | Efficient smart contracts requiring the ability to execute Turning complete programs on large quantities of data without heavy cost |
| Consensus | Minimal energy usage to ensure energy sustainability goals of CES | Avoid computationally expensive PoW consensus algorithms |

TABLE IV-continued

CES Requirements Mapping to Blockchain Features

| | CES Requirements | Blockchain Features |
|---|---|---|
| Privacy | Crowdsourcee preferences and usages likely exposes privacy data | Permissioned model that protects crowdsourcee data from external observers |

This, unlike other blockchain applications, still requires a central authority, i.e., the utility company or the system operator, to manage the grid, provide technical support for small-scale energy trading, clear the market, and ensure there is no violation of any technical constraints (e.g., distribution line limits). Small-scale energy trading without a central authority can take place, yet the scaling of these transactions to include thousands of people and millions of daily energy transactions without the utility coordinating the communication among small-scale energy trading systems is remote in today's markets. To this end, the presented architecture in this disclosure requires a central authority to manage the grid but can also autonomously be run in islanded microgrids as we showcase in the case studies section.

Blockchain Implementation Using Hyperledger Fabric

Figure 4:
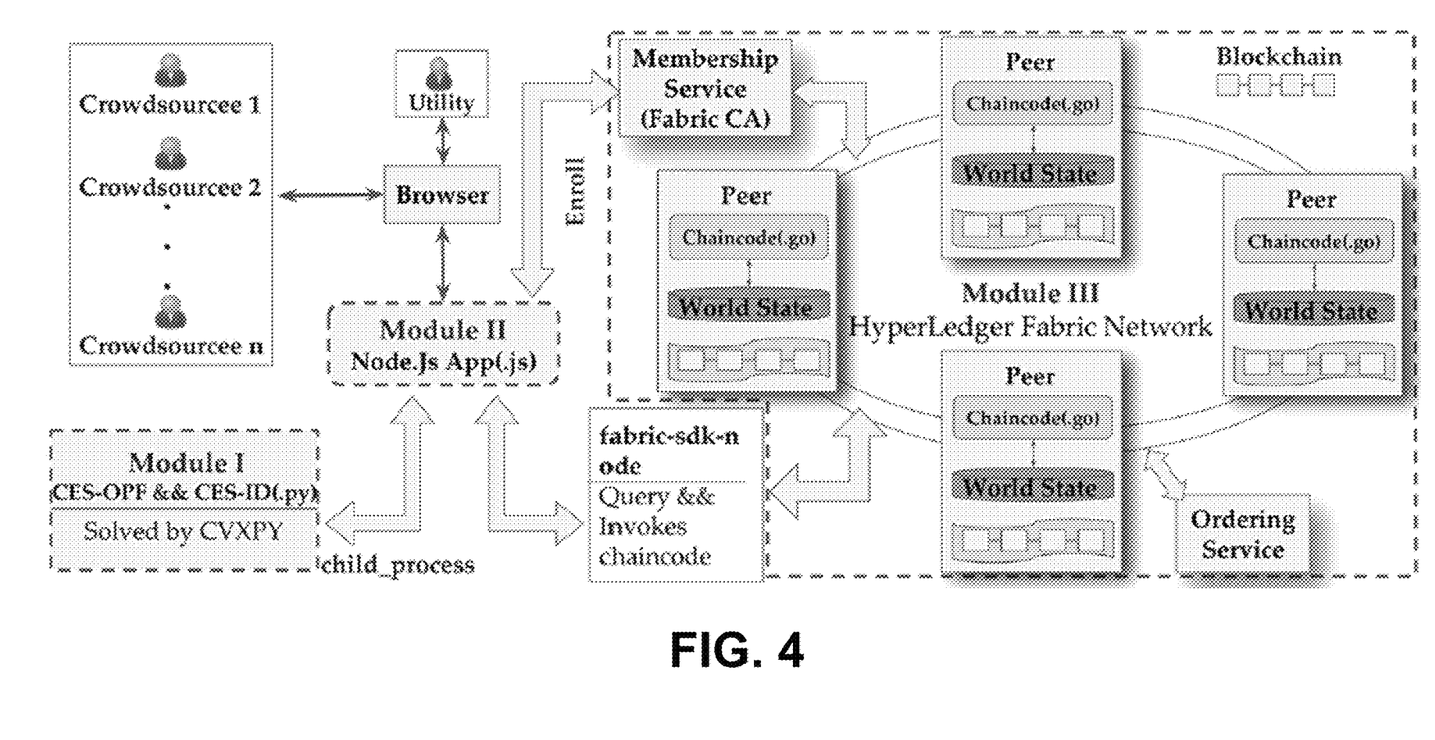
FIG. 4 is a schematic diagram that illustrates an architecture for combining blockchain and smart contracts with optimization formulations, according to various example embodiments.

We integrate and implement blockchain and smart contracts with the optimization models discussed above. This is shown in FIG. 4. The presented CES implementation consists of three modules surrounded by the dotted lines in FIG. 4. Module I includes the optimization problems, which are coded by CVXPY. Module II is a Node.js application, also take care of the communication between Python-written optimization problem and Module III. This process is finished by the child_process standard library which generates a Python process and computes the solutions to CES-OPF (7), CES-ID (9) while returning results back to Node.js program.

Module III, the information system, is implemented by the IBM Hyperledger Fabric network deployed in cloud to provide the blockchain service. The network consists of many peers that communicate with each other, runs smart contracts called chaincode which is written by Go language, holds state and ledger data. Peers in the Hyperledger Fabric Network are different from the ones in the other blockchain implementations. The roles of peers relate to the life-cycle of transactions which is one key difference between Hyperledger Fabric and many other blockchain platforms. The life-cycle of a transaction in other blockchain platforms is usually order-execute, which means that transactions are added to the ledger in a specific order and executed sequentially. But in Hyperledger Fabric, it is a three-step process: execute-order-validate. First, transactions are executed in parallel considering any order. Second, they are ordered by an ordering service. Third, each peer validates and applies the transactions in sequence. The roles of peers also have a strong relationship with robust privacy and permission support.

The crowdsourcees shown in FIG. 4 are the end-users in the distribution network and can perform energy trading. Thousands of crowdsourcees are allowed to connect and sign up to the Fabric network via a browser after receiving a code from the operator. The operator also can log in via browser to manage the overall system. After enrolling in the network via Fabric-CA, a certificate needed for enrollment through a software development kit (SDK), crowdsourcees can communicate with the network through fabric-sdk-node, update their preferences to blockchain, and store it in World State which is the database. Peers in Hyperledger are used to conduct transactions, maintain the world state, and maintain a copy of the ledger (consists of blocks). The chaincode in Hyperledger Fabric is deployed into peers and is executed as a user satisfies their commitments. Then, ordering service, akin to mining in Bitcoin, generates new blocks in Fabric. Every peer updates their local blockchain after receiving ordered state updates in the form of blocks from the ordering service. In this way, the order and number of blocks, a form of blockchain, are maintained and synchronized for all peers. The ETTs records are included in blockchain stored at each peer's repository and protected by this mechanism.

This specific implementation is endowed with the following characteristics: 1) scalable to millions of crowdsourcees; 2) requires little understanding of the blockchain technology from the users' side; 3) communicates seamlessly with any optimization-based formulation; and 4) requires very little energy to run blockchain. Algorithm 1 illustrates how the developed optimization routines are implemented with blockchain and smart contracts.

---

Algorithm 1 Block-chain-Assisted CES Operation

Phase I:
Obtain crowdsourcees preferences $\lambda_1$
Request/obtain day-ahead P2P ETT requests via blockchain implementation developed (FIG. 4)
Estimate day-ahead forecasts $y_t^{f-24hr}$
Solve CES-OPF (7) and obtain generator and DER schedules
Establish Type A ETTs smart contracts for users $i \in \mathcal{G} \cup \mathcal{CT}_1$
Establish Type B ETTs smart contracts for users $i \in \mathcal{CT}_2$
Phase II:
while $t \in 1, \ldots, 24$ hrs do
   Select Type 2 crowdsourcees willing to sell solar power to the utility at time t according to the preferences $\lambda_{2_t}$
   Obtain hour-ahead forecasts $y_t^{f-1hr}$
   Solve CES-ID (9) at time t
   Communicate to crowdsourcees $i \in \mathcal{CT}_2$ incentives $\lambda_{i,t}^{eq} + \lambda_{i,t}^{a}$
   Establish Type A ETTs smart contracts for users $i \in \mathcal{CT}_2$
end while
Reconcile payments weekly or monthly

---

Case Studies
Simulation Setup

The numerical tests are simulated in Ubuntu 16.04.4 LTS with an Intel Xeon CPU E5-1620 v3 @ 3.50 GHz. We use the Southern California Edison (SCE) 56-bus test feeder as a distribution network. Reasonable uncontrollable load profile $P^u$ is generated for T=24 h from California Independent System Operator (CAISO) and normalized to ensure that the optimization problems have feasible sets for different time periods. We modify SCE 56-bus test feeder as shown in FIG. 2 and place stationary batteries, solar panels, and uncontrollable and shapeable loads at each bus in the network (see FIG. 5). Batteries are set up with a power capacity of 80% of the peak uncontrollable load at the bus, a 4-h energy storage capacity with 20% initial energy storage. We assume that the solar generation power profile is given and contributes to 50% of the uncontrollable load at peak for each bus. Shapeable loads have net energy demand that is up to 20% the peak power consumption of the uncontrollable loads and can be charged for 4-8 h. The scheduling time of shapeable loads is from 8 A.M. to 11 P.M.

Figure 5:
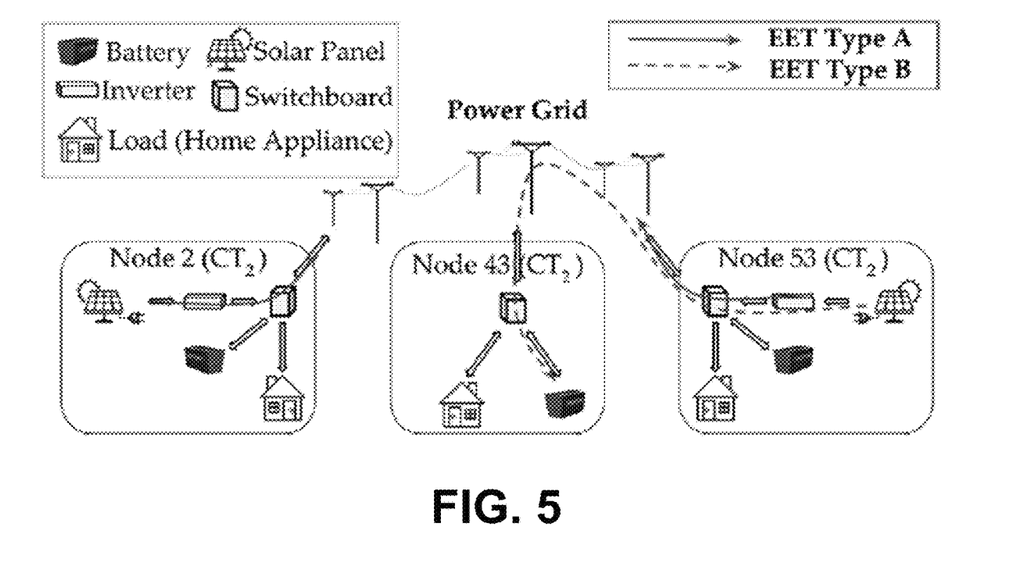
FIG. 5 is a schematic diagram that illustrates scenarios of energy trading transactions, according to various example embodiments.

We also assume that each bus is connected to a crowdsourcee of Type 1 ($CT_1$) or Type 2 ($CT_2$). We make the following assignment: if the number of a bus is a prime number, then the user belongs to ($CT_2$), otherwise they belong to ($CT_1$) (we have $|CT_1|$=40 and $|CT_2|$=16). From the above setup, Nodes 2, 43, and 53 belong to ($CT_2$) in FIG. 5. As we present in Table III, two types of ETT take place in CESs. Type A transactions occur between ($CT_1$) or ($CT_2$) with utilities, while the trading transactions among (CT) users are Type B transactions. In FIG. 5, we present two scenarios of ETT for further explanation: 1) ETT Type A where Node 2 decides to sell excess solar energy to the utility and 2) ETT Type B where Node 43 chooses to buy energy from Node 53. The next section presents the outcome of the two-phase optimization.

Results and Discussion

In order to present the effectiveness of our algorithm, we compare the cases with and without considering the energy trading among crowdsourcees based on the modified SCE 56 bus test feeder.

Figure 6:
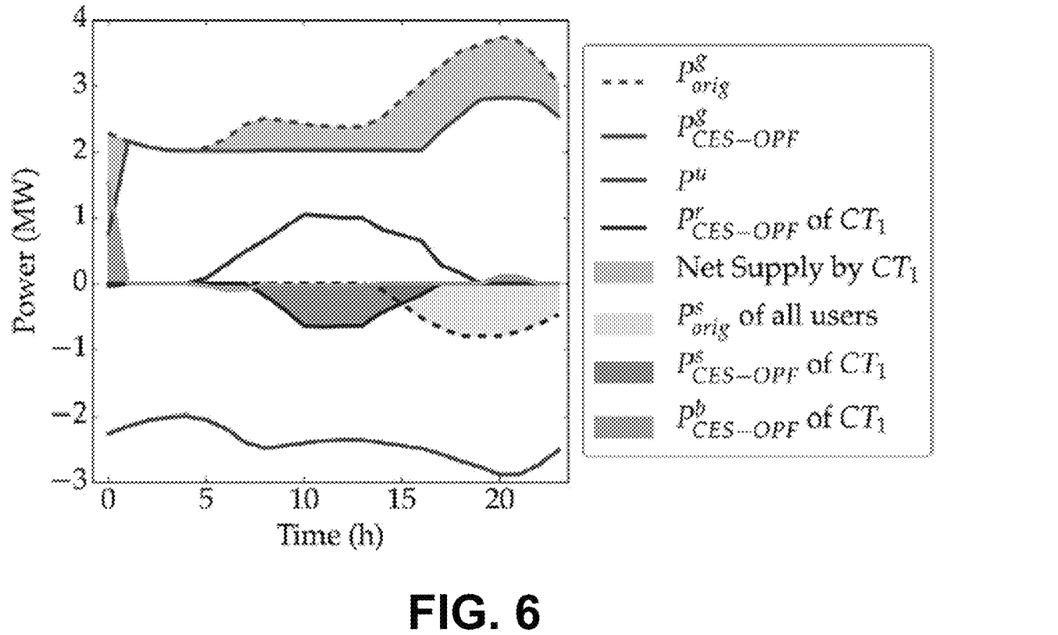
FIG. 6 is a graph that illustrates an aggregate load profile and generation after solving CES-OPF, according to various example embodiments.
Figure 7:
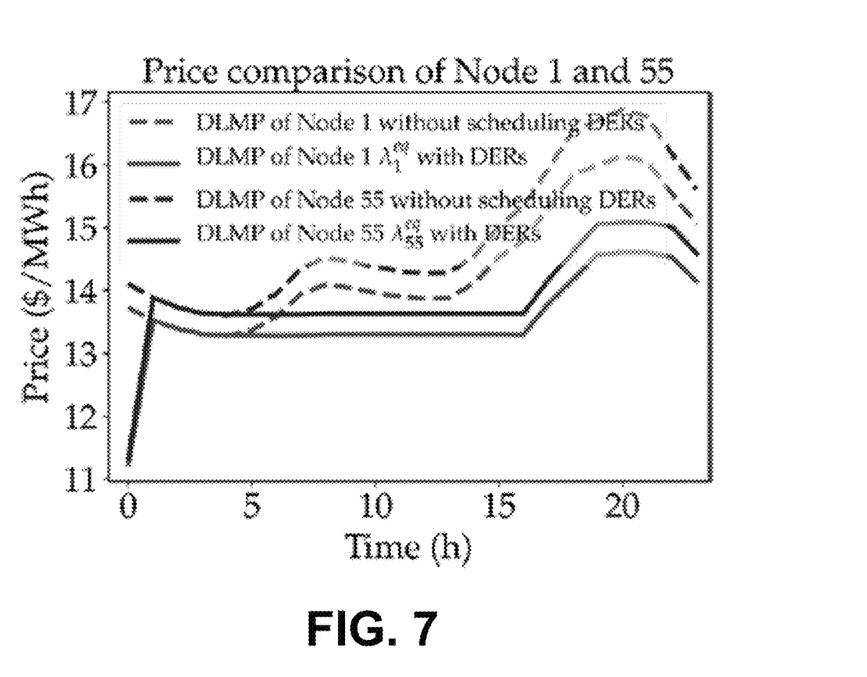
FIG. 7 is a graph that illustrates a price comparison after solving CES-OPF, according to various example embodiments.

1) Phase I (Day-Ahead CES Operation): Solving CESOPF (7). FIG. 6 shows $P^u$, $P_{orig}^s$, and $P_{orig}^g$ (the aggregate uncontrollable load, shapeable load, and the output of generator) when the algorithm is not applied, in the absence of energy crowdsourcing or trading between crowdsourcing. FIG. 6 also shows the aggregate load profile and generation after solving the CES-OPF for T=24 h. The figure shows that battery variable $P_{CES-OPF}^b$ charges when the solar panel produces and injects power $P_{CES-OPF}^b$ into network. The reason why the curve of $P_{CES-OPF}^b$ does not change significantly is that the solar panels do not generate enough energy in this setup. Hence, the algorithm is less inclined to store energy into batteries. See FIG. 11 for scenarios in which the solar panel produces enough energy. FIG. 6 indicates that shapeable loads of $CT_1$ are rescheduled to $P_{CES-OPF}^b$. The updated power generation $P_{CES-OPF}^b$ is smaller than $P_{orig}^g$ due to the injections of solar power, scheduling of batteries, and shapeable loads from crowdsourcees CT 1. FIG. 7 presents the changes in the DMLPs with and without scheduling DERs in the distribution network through CESOPF (7) for Nodes 1 and 55. The DLMPs for both nodes are smaller due to the net injection from Type 1 crowdsourcees (shaded orange area in FIG. 6). This illustrates how the DLMP price becomes lower when rescheduling DERs and injecting renewable energy into the grid.

2) Phase II (Real-Time CES Incentives Design): CESID is solved once every hour but it can also be solved every 5-15 min depending on the availability of accurate weather/load forecasts. The monetary rewards offered to Type 2 crowdsourcees are obtained from CES-ID. We assume that the crowdsourcees of Type 2 at Nodes 2, 43, and 53 accept the designed incentives.

Figure 8:
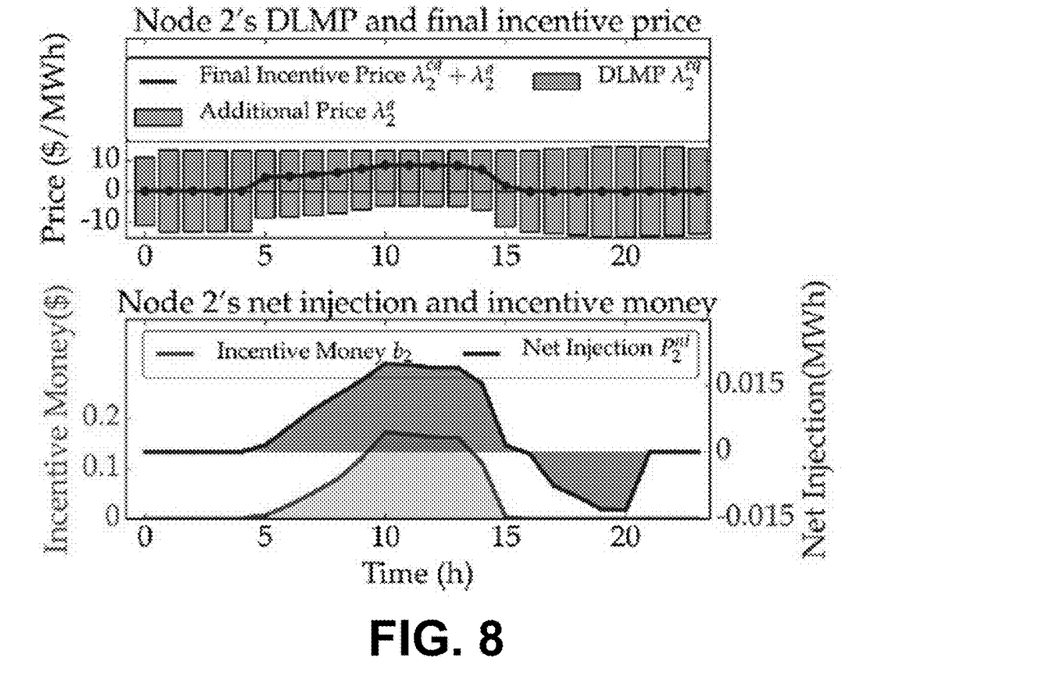
FIG. 8 is a graph that illustrates a final incentive price, net injection, and incentive money, according to various example embodiments.

FIG. 8 shows the final incentive price, net injection, and overall incentive money for Node 2. The time-varying nature of the final incentive price of a node is due to variations of its DLMP and its net injection. We assume that the solar panel produces energy between 6 A.M. and 7 P.M. The solar panel of Node 2 produces solar power and incentives are earned by the customer between 6 A.M. and 2 P.M. as shown in FIG. 8. However, the load at Node 2 starts to consume energy at 5 P.M. making the net injection of Node 2 is 0 MWh. Hence, no monetary incentives are offered from 7 P.M. to 11 P.M.

Figure 9:
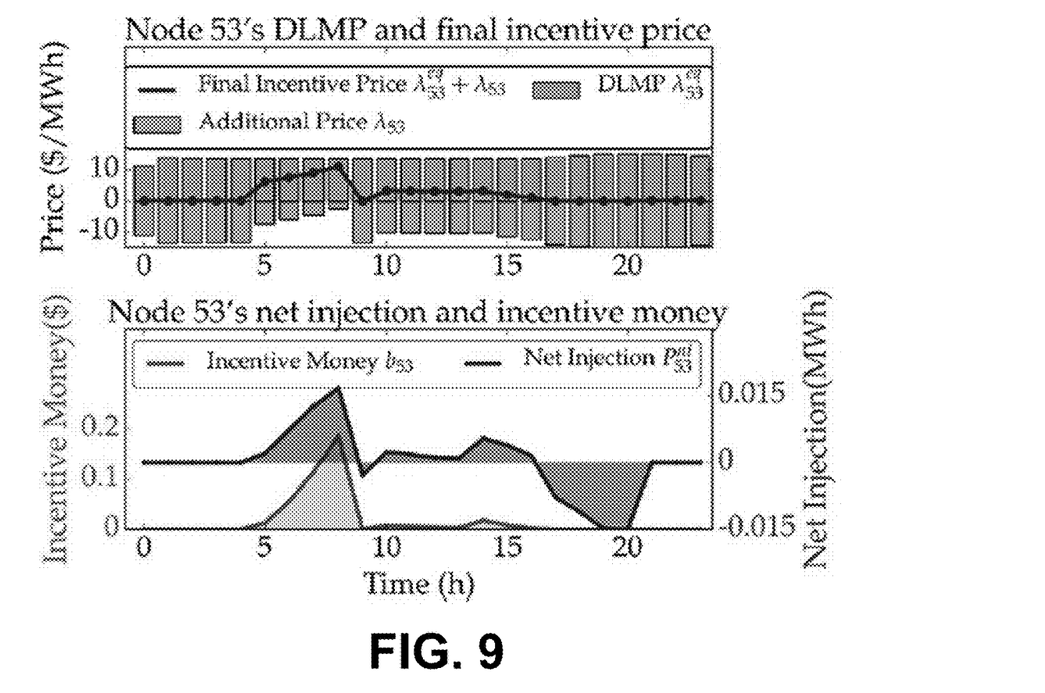
FIG. 9 is a graph that illustrates a final incentive price, net injection, and incentive money, according to various example embodiments.

FIG. 9 presents the results for Type B transactions for ($CT_2$) user at Node 53. The user at Node 43 decides to charge the battery at a constant charging rate between 9 A.M. and 2 P.M., and the excess solar energy produced from Node 53's solar power can satisfy this demand shortage. Notice that Node 43 only consumes energy while Node 53 earns incentive rewards from the utility and negotiated money from Node 43 during different time periods. The transaction details between these crowdsourcees are summarized in Table V.

TABLE V

Transaction Details for Node 53

| Time | Seller | Buyer | Energy | EET TYPE | Phase |
|---|---|---|---|---|---|
| 6 am-9 am | Node 53 | Utility | 0.0385 MWh | Type A | Phase II |
| 9 am-2 pm | Node 53 | Node 43 | 0.119 MWh | Type B | Phase I |
| 4 pm-5 pm | Node 53 | Utility | 0.062 MWh | Type A | Phase II |

Figure 10:
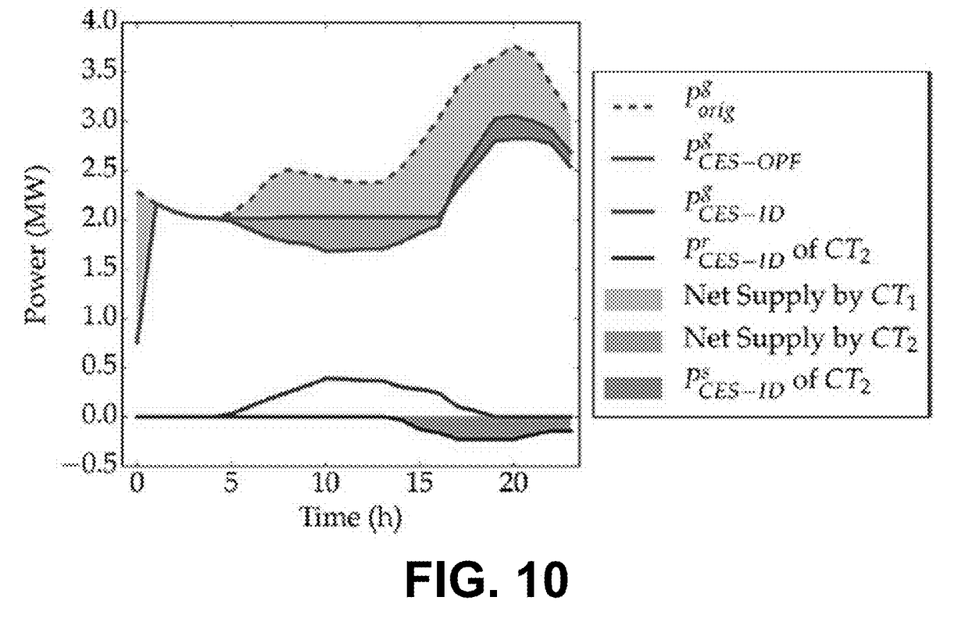
FIG. 10 is a graph that illustrates aggregate load profiles and generation, according to various example embodiments.

FIG. 10 depicts the aggregate load profile and generation after Algorithm 1 terminates. More renewable energy is injected into the grid and traded via the designed incentives for ($CT_2$) crowdsourcees. It is noteworthy to mention that the utility cannot schedule the shapeable loads of ($CT_2$) crowdsourcees. The generator at the substation covers this demand shortage (see FIG. 10), where $P_{CES-ID}^g$ is greater than $P_{CES-OPF}^g$ from 3 P.M. to 11 P.M.

Figure 11:
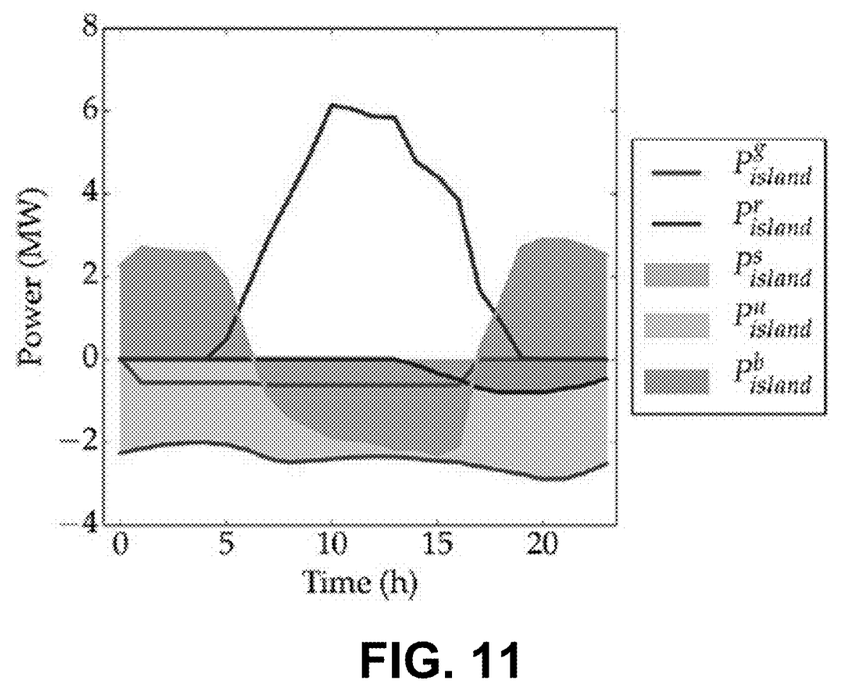
FIG. 11 is a graph that illustrates results for an islanded, autonomous microgrid operation, according to various example embodiments.

3) Islanded Microgrid Test: After implementing P2P energy trading, we simulate a scenario of a small islanded, autonomous microgrid. In this microgrid, we assume the following. First, all users have: 1) enough solar power to produce enough energy to supply the grid and 2) the microgrid has a battery with sufficient capacity to store excess solar energy. Second, each user agrees to participate in the program and their DERs would be fully controlled by the microgrid management algorithm akin to Algorithm 1. The simulation setup remains the same as above, except the solar panels produce more energy and the capacities of batteries are enlarged. FIG. 11 shows the outcome of the autonomous microgrid operation. Between 6 A.M. and 7 P.M., the solar panel on each crowdsourcees' roof not only produces enough energy to meet the real-time load demand but also stores excess energy into batteries for night use. At night, batteries start to discharge energy to cover the demand shortage facilitating ETT with crowdsourcees in need for energy using blockchain and smart contracts.

Figure 12:
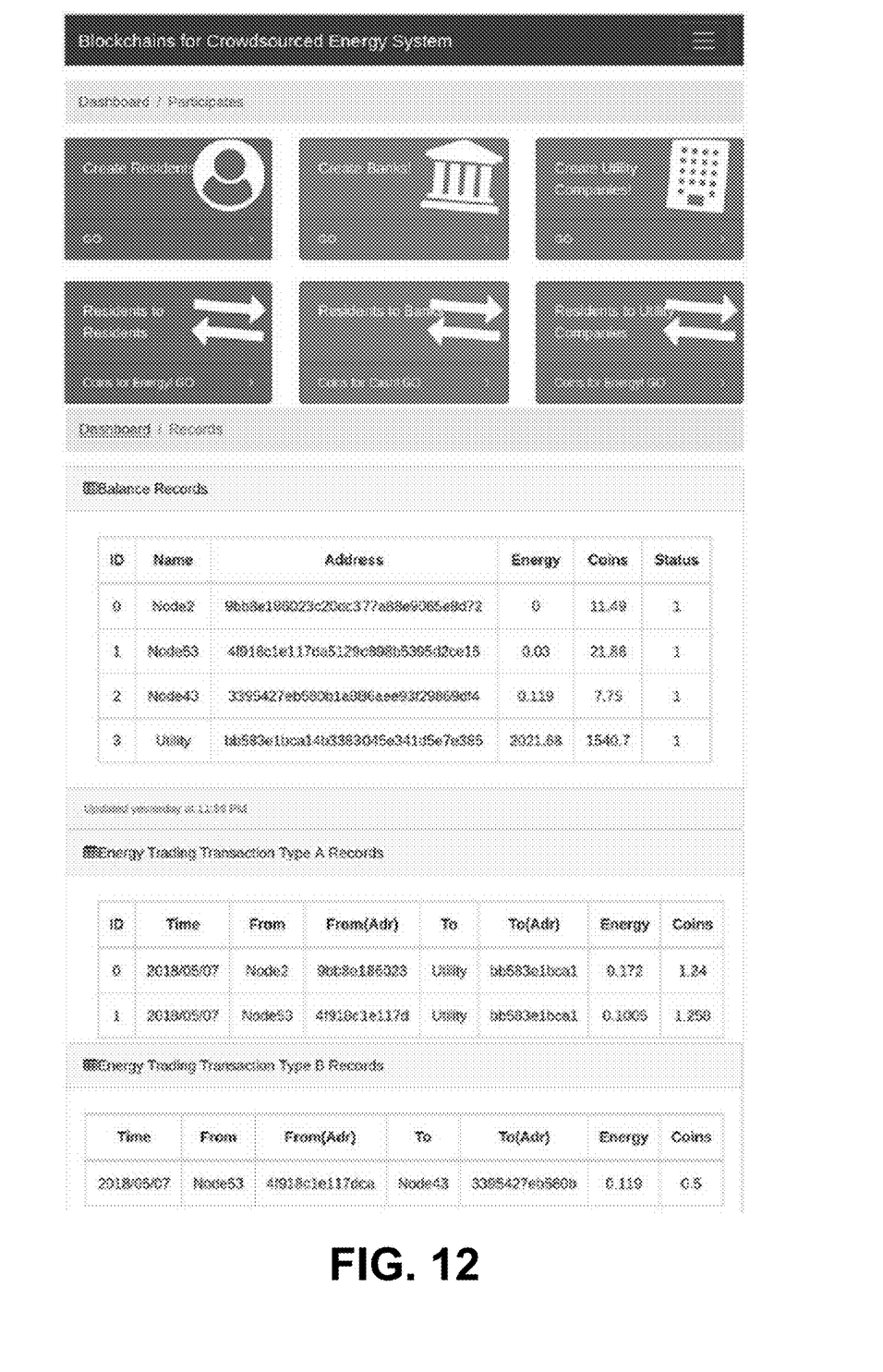
FIG. 12 is a web-based user interface for the crowdsourced energy system, according to various example embodiments.

4) Blockchain and ETT GUI: FIG. 12 shows a Web-based user prototype that we implemented using Hyperledger Fabric. The Web application shows the system operation which includes creating crowdsourcees, selling energy to the utility or neighborhood, and listing all ETT with information about the prices and the users. This Web-based prototype interacts with the optimization solvers and algorithms that generate forecasts, as well as the crowdsourcees.

Conclusion

This disclosure introduced the notion of blockchain-assisted CESs with a specific implementation and prototype of blockchain that scales to include millions of crowdsourcees and P2P ETTs. A thorough review of the blockchain technology for energy systems is given. Various types of crowdsourcees and ETTs are introduced to mimic current and projected energy market setups. Then, an operational OPF-based model of CESs with batteries, shapeable loads, and other DERs is introduced for distribution networks, Considering ETT and crowdsourcees preferences, yielding a day-ahead market equilibrium. Monetary incentives are designed to attract crowdsourcees in hour-ahead and real-time markets to the computed equilibrium while satisfying a demand shortage or surplus. Furthermore, an implementation of blockchain through the IBM Hyperledger Fabric is discussed with its coupling with the optimization models. This implementation allows the system operator to manage the network users to seamlessly trade energy. Finally, case studies are given to illustrate the practicality of the presented methods for classical distribution networks, as well as self-sufficient and islanded microgrids.

Computer Implementation

Figure 13:
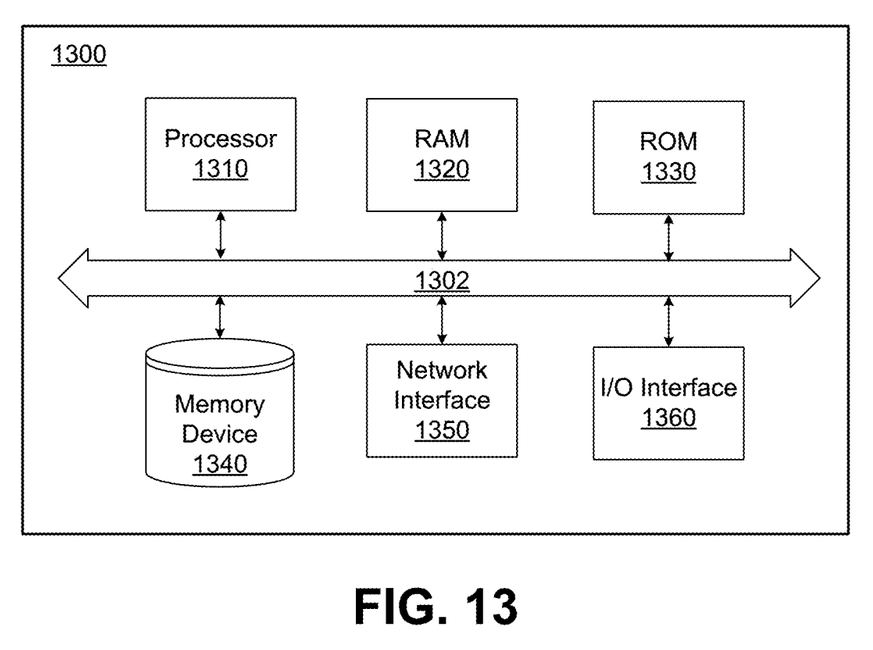
FIG. 13 is a schematic diagram that illustrates an example computing device, according to various embodiments.

Turning to FIG. 13, an example hardware diagram of a computing device 1300 is illustrated. Any of the functionality described herein may be implemented, in part, using one or more elements of the computing device 1300. The computing device 1300 can include one or more of a processor 1310, a Random Access Memory ("RAM") 1320, a Read Only Memory ("ROM") 1330, a memory device 1340, a network interface 1350, and an Input Output ("I/O") interface 1360. The elements of the computing device 1300 are communicatively coupled via a bus 1302.

The processor 1310 can include an arithmetic processor, Application Specific Integrated Circuit ("ASIC"), or other types of hardware or software processors. The RAM and ROM 1320 and 1330 can include a memory that stores computer-readable instructions to be executed by the processor 1310. The memory device 1330 stores computer-readable instructions thereon that, when executed by the processor 1310, direct the processor 1310 to execute various aspects of the present disclosure described herein. When the processor 1310 includes an ASIC, the processes described herein may be executed by the ASIC according to an embedded circuitry design of the ASIC, by firmware of the ASIC, or both an embedded circuitry design and firmware of the ASIC. As a non-limiting example group, the memory device 1330 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1350 can include hardware interfaces to communicate over data networks. The I/O interface 1360 can include device input and output interfaces such as keyboard, pointing device, display, communication, and other interfaces. The bus 1302 can electrically and communicatively couple the processor 1310, the RAM 1320, the ROM 1330, the memory device 1340, the network interface 1350, and the I/O interface 1360, so that data and instructions may be communicated among them.

In operation, the processor 1310 is configured to retrieve computer-readable instructions stored on the memory device 1340, the RAM 1320, the ROM 1330, or another storage means, and copy the computer-readable instructions to the RAM 1320 or the ROM 1330 for execution, for example. The processor 1310 is further configured to execute the computer-readable instructions to implement various aspects and features of the present disclosure. For example, the processor 1310 may be adapted and configured to execute the processes described above including the processes described as being performed by the modules of the ranking and optimizing front end X00. Also, the memory device 1340 may store a data stored.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

The invention claimed is:

1. A crowdsourced energy system, comprising:
a power network configured to deliver energy to end users;
a system operator that distributes energy over the power network and manages energy trading transactions between itself and crowdsourcees as well as between crowdsourcees within the crowdsourced energy system;
a plurality of first distributed energy resources each configured to supply energy to the power network, the first distributed energy resources being possessed by a first type of crowdsourcees of the crowdsourced energy system but exclusively controlled by the system operator;
a plurality of second distributed energy resources each configured to supply energy to the power network, the second distributed energy resources being possessed and exclusively controlled by a second type of crowdsourcees of the crowdsourced energy system; and
at least one computing device controlled by the system operator, the computing device being configured to execute a two-phase energy management scheme, wherein the computing device is configured to, in a first phase of the energy management scheme, perform day-ahead scheduling of energy generation and supply for the first distributed energy resources possessed by the first type of crowdsourcees and, in a second phase of the energy management scheme, perform same-day adjustments to the day-ahead scheduled energy generation and supply by identifying on the same day crowdsourcees of the second type who are willing to supply energy from their second distributed energy resources to the power network.

2. The system of claim 1, wherein the first and second distributed energy resources include one or more of dispatchable generators, solar energy systems, and stationary batteries.

3. The system of claim 1, wherein each distributed energy resource is connected to a smart meter managed by a crowdsourcee, the smart meters being in electrical communication with the at least one computing device operated by the system operator.

4. The system of claim 1, wherein the system operator is a power utility that also generates energy supplied to the power network.

5. The system of claim 1, wherein the at least one computing device is configured to perform day-ahead scheduling of energy generation and supply by:

obtaining day-ahead peer-to-peer energy trading transaction requests from crowdsourcees for energy to be delivered from the distributed energy resources;
estimating day-ahead energy load and solar forecasts;
determining optimal power flow for the delivery of energy; and
scheduling delivery of energy from the first distributed energy resources across the power network based upon the energy trading transaction requests, the estimated forecasts, and the determined optimal power flow.

6. The system of claim 5, wherein determining optimal power flow comprises minimizing the cost of energy production and thermal losses.

7. The system of claim 5, wherein the at least one computing device is configured to perform the same-day adjustments to the scheduled energy generation and supply by also:
estimating hour-ahead energy load and solar forecasts to correct previous estimated day-ahead forecasts;
computing incentives to be provided to the identified crowdsourcees of the second type; and
scheduling delivery of energy from the second distributed energy resources across the power network based upon the identified crowdsourcees of the second type, the estimated hour-ahead forecasts, and the computed incentives.

8. The system of claim 1, wherein the crowdsourcing energy system is implemented using a blockchain platform.

9. A method for delivering energy in a crowdsourced energy system, the method comprising:
an operator of the crowdsourced energy system who distributes energy over a power network and manages energy trading transactions on the system controlling at least one computing device to execute a two-phase energy management scheme,
wherein the at least one computing device, in a first phase of the energy management scheme, performs day-ahead scheduling of energy generation and supply for first distributed energy resources possessed by a first type of crowdsourcee but exclusively controlled by the operator, and
wherein the at least one computing device, in a second phase of the energy management scheme, performs same-day adjustments to the day-ahead scheduled energy generation and supply by identifying on the same day crowdsourcees of a second type who possess and exclusively control second distributed energy resources and who are willing to supply energy from their second distributed energy resources to the power network.

10. The method of claim 9, wherein the at least one computing device performs day-ahead scheduling of energy generation and supply for first distributed energy resources by:
obtaining day-ahead peer-to-peer energy trading transaction requests from crowdsourcees for energy to be delivered from the distributed energy resources;
estimating day-ahead energy load and solar forecasts;
determining optimal power flow for the delivery of energy; and
scheduling delivery of energy from the first distributed energy resources across the power network based upon the energy trading transaction requests, the estimated forecasts, and the determined optimal power flow.

11. The method of claim 10, wherein determining optimal power flow comprises minimizing the cost of energy production and thermal losses.

12. The method of claim 10, wherein the at least one computing device performs same-day adjustments to the day-ahead scheduled energy generation and supply by also:
- identifying crowdsourcees willing to supply energy on the present day;
- estimating hour-ahead energy load and solar forecasts to correct previous day-ahead forecasts;
- computing incentives to be provided to the identified crowdsourcees; and
- scheduling delivery of energy from the distributed energy resources across the power network based upon the identified crowdsourcees, the estimated hour-ahead forecasts, and the computed incentives.

13. The method of claim 9, wherein the crowdsourcing energy system is implemented using a blockchain platform.

14. A computing device controlled by an operator of a crowdsourcing energy system who distributes energy over a power network and manages energy trading transactions on the system, the computing device being configured to execute a two-phase energy management scheme in which, in a first phase of the energy management scheme, the computing device performs day-ahead scheduling of energy generation and supply for first distributed energy resources possessed by a first type of crowdsourcee but exclusively controlled by the operator, and in which, in a second phase of the energy management scheme, the computing device performs same-day adjustments to the day-ahead scheduled energy generation and supply by identifying on the same day crowdsourcees of a second type who possess and exclusively control second distributed energy resources and who are willing to supply energy from their second distributed energy resources to the power network.

15. The computing device of claim 14, wherein the computing device performs day-ahead scheduling of energy generation and supply for first distributed energy resources by:
- obtaining day-ahead peer-to-peer energy trading transaction requests from crowdsourcees for energy to be delivered from the distributed energy resources;
- estimating day-ahead energy load and solar forecasts;
- determining optimal power flow for the delivery of energy; and
- scheduling delivery of energy from the first distributed energy resources across the power network based upon the energy trading transaction requests, the estimated forecasts, and the determined optimal power flow.

16. The computing device of claim 15, wherein the computing device is configured to determine optimal power flow by minimizing the cost of energy production and thermal losses.

17. The computing device of claim 15, wherein the computing device performs same-day adjustments to the day-ahead scheduled energy generation and supply by also:
- identifying crowdsourcees willing to supply energy on the present day;
- estimating hour-ahead energy load and solar forecasts to correct previous day-ahead forecasts;
- computing incentives to be provided to the identified crowdsourcees; and
- scheduling delivery of energy from the distributed energy resources across the power network based upon the identified crowdsourcees, the estimated hour-ahead forecasts, and the computed incentives.

18. The computing device of claim 14, wherein the crowdsourcing energy system is implemented using a blockchain platform.

* * * * *